(No Model.)

A. MERRIMAN.
FEED TROUGH.

No. 580,054. Patented Apr. 6, 1897.

Witnesses

Inventor
Abrilla Merriman
By H. B. Willson
Attorney

UNITED STATES PATENT OFFICE.

ABRILLA MERRIMAN, OF MARTINSVILLE, INDIANA.

FEED-TROUGH.

SPECIFICATION forming part of Letters Patent No. 580,054, dated April 6, 1897.

Application filed January 9, 1897. Serial No. 618,596. (No model.)

*To all whom it may concern:*

Be it known that I, ABRILLA MERRIMAN, a citizen of the United States, residing at Martinsville, in the county of Morgan and State of Indiana, have invented certain new and useful Improvements in Feed-Troughs for Poultry; and I do declare the following to be a full, clear, and exact description of the invention, such as will enable others skilled in the art to which it appertains to make and use the same.

My invention has relation to improvements in feed-troughs for poultry; and the object is to provide a simple, cheap, and economical device of this kind.

To this end the novelty consists in the construction, combination, and arrangement of the same, as will be hereinafter more fully described, and particularly pointed out in the claim.

In the accompanying drawings the same reference-numerals indicate the same parts of the invention.

Figure 1:
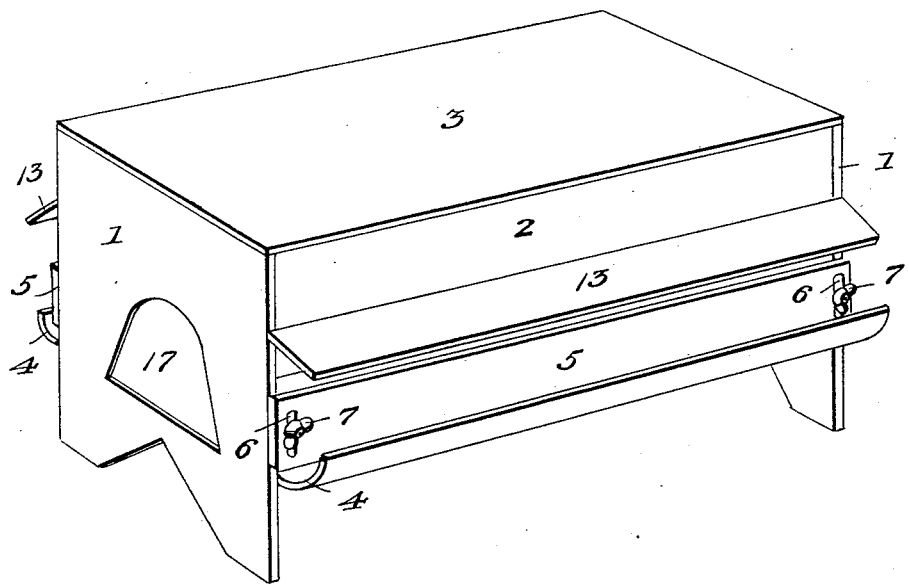
Figure 2:
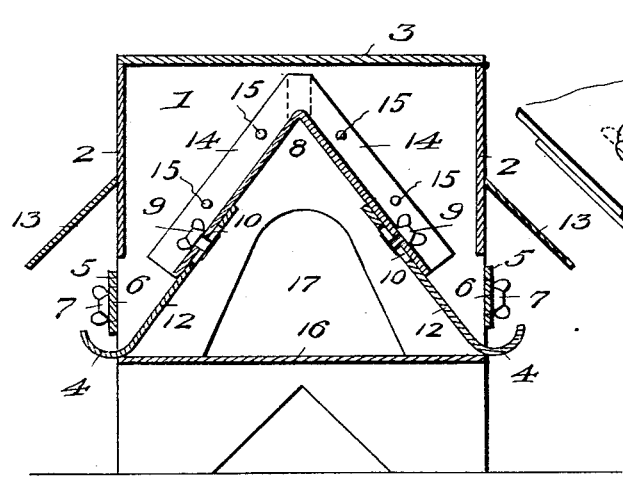
Figure 3:
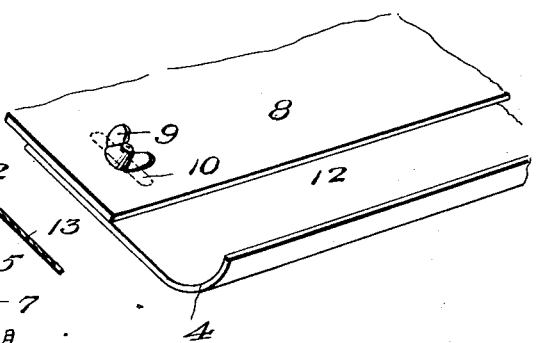

Figure 1 is a perspective view of a poultry feed-trough embodying my invention. Fig. 2 is a transverse vertical section of the same, and Fig. 3 is a detail perspective showing the manner of regulating the discharge-openings for the grain.

My improved poultry-trough is formed with the rectangular vertical parallel ends 1 1, connected by the vertical parallel sides 2 2, the whole being protected by a suitable hinged cover 3.

The ends 1 1 rest upon the ground and form the legs or supports for the trough, while the sides extend from the top to within a short distance of the seed-troughs 4 4, the intervening space being occupied by an adjustable slide 5, the ends of which are formed with vertical slots 6 6, through which the thumb-screws 7 7 pass to secure said slide to the contiguous front edges of the ends 1 1.

8 represents the inverted-V-shaped bottom of the trough proper, its lower longitudinal ends being provided with thumb-screws 9 9, which pass through the slots 10 10 in the upper ends of the troughs or gutters 12 12, so that their lower portion containing the seed may be projected more or less beyond the vertical face of the slides 5 to enable the fowls to have ready access to the grain.

13 represents longitudinal hoods inclined forwardly and downwardly to protect the seed in the troughs 12 12 from the rain.

The ends of the inclined bottom 8 are formed with right-angular flanges 14 14, which are suitably secured to the inside of the ends 1 1 by suitable fastenings 15, and 16 represents a horizontal plane bottom extending entirely across the inside of the trough proper and below the V-shaped bottom to form an apartment for the chicks, access being had thereto by an opening 17.

The convenience and utility of the device will be fully understood and appreciated from the above, and although I have specifically described the construction and relative arrangement of the several elements of my invention I do not desire to be confined thereto, as such changes or modifications may be made as clearly fall within the scope of my invention without departing from the spirit thereof.

Having thus fully described my invention, what I claim as new and useful, and desire to secure by Letters Patent of the United States, is—

A poultry feed-trough, comprising a rectangular receptacle having parallel ends 1 1, one of which is provided with an opening 17, the parallel sides connecting said ends, the horizontal bottom 16, the hinged cover 3, and the inverted-V-shaped bottom 8, in combination with the gutter-troughs 12, having vertical slots 10, the thumb-screws 9 9, and the adjustable slides 5 5, having slots 6 6, and thumb-screws 7 7, substantially as shown and described.

In testimony whereof I hereunto affix my signature in presence of two witnesses.

ABRILLA $\overset{\text{her}}{\times}$ MERRIMAN.
$\phantom{ABRILLA\ }$ mark

Witnesses:
W. H. MERRIMAN,
ROY L. MCNAIR.